(12) United States Patent
Lee et al.

(10) Patent No.: US 8,147,107 B2
(45) Date of Patent: Apr. 3, 2012

(54) HEADLIGHT ROTATING DEVICE FOR VEHICLE

(75) Inventors: Chien Hung Lee, Taichung Hsien (TW); San Chi Chang, Taichung Hsien (TW); Yu Kai Chen, Taichung Hsien (TW)

(73) Assignee: Jing Hang Enterprise Co., Ltd., Dadu Hsiang, Taichung Hsien (TW)

( * ) Notice: Subject to any disclaimer, the term of this patent is extended or adjusted under 35 U.S.C. 154(b) by 253 days.

(21) Appl. No.: 12/592,087

(22) Filed: Nov. 19, 2009

(65) Prior Publication Data

US 2011/0116280 A1     May 19, 2011

(51) Int. Cl.
    *F21V 21/14*      (2006.01)

(52) U.S. Cl. ........ 362/523; 362/526; 362/530; 362/286; 362/287

(58) Field of Classification Search .................. 362/469, 362/467, 465, 525, 530, 531, 287, 285, 286, 362/282, 277, 523, 526
See application file for complete search history.

(56) References Cited

U.S. PATENT DOCUMENTS

| | | | |
|---|---|---|---|
| 4,340,928 A | 7/1982 | Hohmann, Jr. | |
| 5,099,400 A | 3/1992 | Lee | |
| 6,457,851 B2 * | 10/2002 | Hamm | 362/525 |
| 7,703,954 B2 * | 4/2010 | Kusagaya | 362/465 |

FOREIGN PATENT DOCUMENTS

FR     2813829 A1 *   3/2002

* cited by examiner

*Primary Examiner* — Robert May
(74) *Attorney, Agent, or Firm* — Charles E. Baxley

(57) ABSTRACT

A headlight rotating device includes a carrier pivotally and slidably supported in a housing for supporting a light device, a lever supported in the housing and coupled to the carrier for pivoting and sliding the carrier relative to the housing, and a motor is disposed in the housing and coupled to the lever for rotating the lever to pivot and slide the carrier relative to the housing and for rotating the headlight device of the vehicle in accordance with the movement of the vehicle's steering system and for suitably lighting the environment for the vehicle driver while turning the vehicle, the carrier is adjustable or movable forwardly or rearwardly relative to the housing.

11 Claims, 8 Drawing Sheets

HEADLIGHT ROTATING DEVICE FOR VEHICLE

BACKGROUND OF THE INVENTION

1. Field of the Invention

The present invention relates to a headlight rotating device for a vehicle, and more particularly to a headlight rotating device including an improved structure for suitably pivoting or rotating a headlight device of a vehicle in accordance with the movement of the vehicle's steering system and for suitably lighting the environment for the vehicle driver.

2. Description of the Prior Art

Typical headlight rotating devices comprise small DC motors wired to a mechanical linkage mounted on the vehicle's steering column, and a servo unit coupled to a reflector with a pivotal or rotatable shaft for pivoting or rotating the reflector in order to rotate the headlight in accordance with the movement of the vehicle's steering system.

For example, U.S. Pat. No. 4,340,928 to Hohmann, Jr. discloses one of the typical rotatable vehicle headlights and also comprising a reflector rotatably disposed or mounted around a light bulb, and a pivotal or rotatable shaft coupling the reflector to a servo unit for pivoting or rotating the reflector in order to rotate the headlight in accordance with the movement of the vehicle's steering system.

However, only the reflector may be rotated relative to the light bulb and an outer transparent globe, and the vehicle headlight may not be rotated as a whole unit relative to an outer transparent globe or relative to the vehicle.

U.S. Pat. No. 5,099,400 to Lee discloses another typical headlight moving apparatus for a motor vehicle comprising a steering wheel angle detecting member, and an actuating member operatively associated with the steering wheel and the headlight angle detecting member in order to swing the headlight right and left on the basis of the angular position or the movement of the steering wheel.

However, a complicated gearing system is required to be provided to pivot or rotate the headlight, and the headlight may not be moved or adjusted relative to an outer receptacle or relative to the vehicle.

The present invention has arisen to mitigate and/or obviate the afore-described disadvantages of the conventional headlight rotating devices.

SUMMARY OF THE INVENTION

The primary objective of the present invention is to provide a headlight rotating device including an improved structure for suitably pivoting or rotating a headlight device of a vehicle in accordance with the movement of the vehicle's steering system and for suitably lighting the environment for the vehicle driver.

The other objective of the present invention is to provide a headlight rotating device including an adjustable structure for adjustably pivoting or rotating the headlight device of the vehicle and for fitting or mounting or attaching the headlight rotating device to various kinds of vehicles having headlight devices of different dimensions or sizes.

In accordance with one aspect of the invention, there is provided a headlight rotating device comprising a housing including a chamber formed therein, a hood attached to a front portion of the housing, a carrier pivotally and slidably supported in the chamber of the housing with an axle and movable toward and away from the hood, a light device attached to the carrier, a lever pivotally supported in the chamber of the housing with a shaft, and pivotally coupled to the carrier for pivoting and sliding the carrier relative to the housing, and a motor disposed in the chamber of the housing and coupled to the lever for rotating the lever to pivot and slide the carrier relative to the housing.

The carrier includes a channel formed therein for slidably receiving a rod, and the axle is bent or extended from the rod and pivotally coupled to the housing. The housing includes a bar attached thereto, and the axle is pivotally coupled to the bar of the housing.

The housing includes a depression formed in a bulge for engaging with the bar. The carrier includes an arm having the channel formed in the arm for slidably receiving the rod and for guiding the rod to slide relative to the carrier.

The carrier includes a tubular member engaged in the channel of the carrier for slidably receiving and engaging with the rod. The lever is pivotally pivotally coupled to the arm of the carrier.

The lever includes a key hole formed therein, and a column is disposed in the chamber of the housing and includes a key extended outwardly therefrom and engaged with the key hole of the lever and rotated in concert with the lever.

The motor includes a spindle, and a crank attached to the spindle and coupled to the lever with a link. The lever includes at least two perforations formed therein for adjustably engaging with the link.

The crank includes at least two apertures formed therein for adjustably engaging with the link. The housing includes two beams, and a seat attached to the beams for supporting the motor in the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
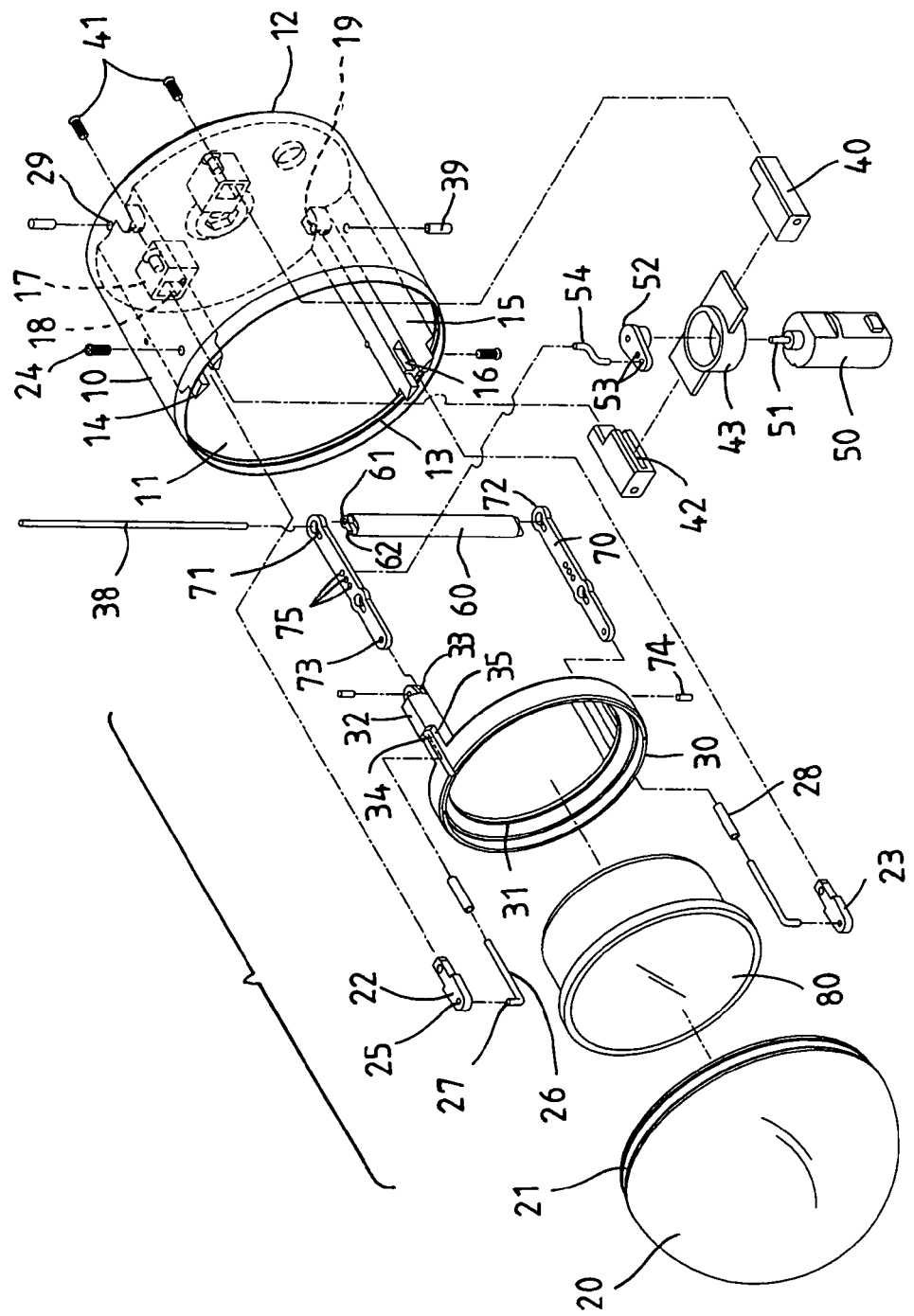
FIG. 1 is a partial exploded view of a headlight rotating device in accordance with the present invention.
Figure 2:
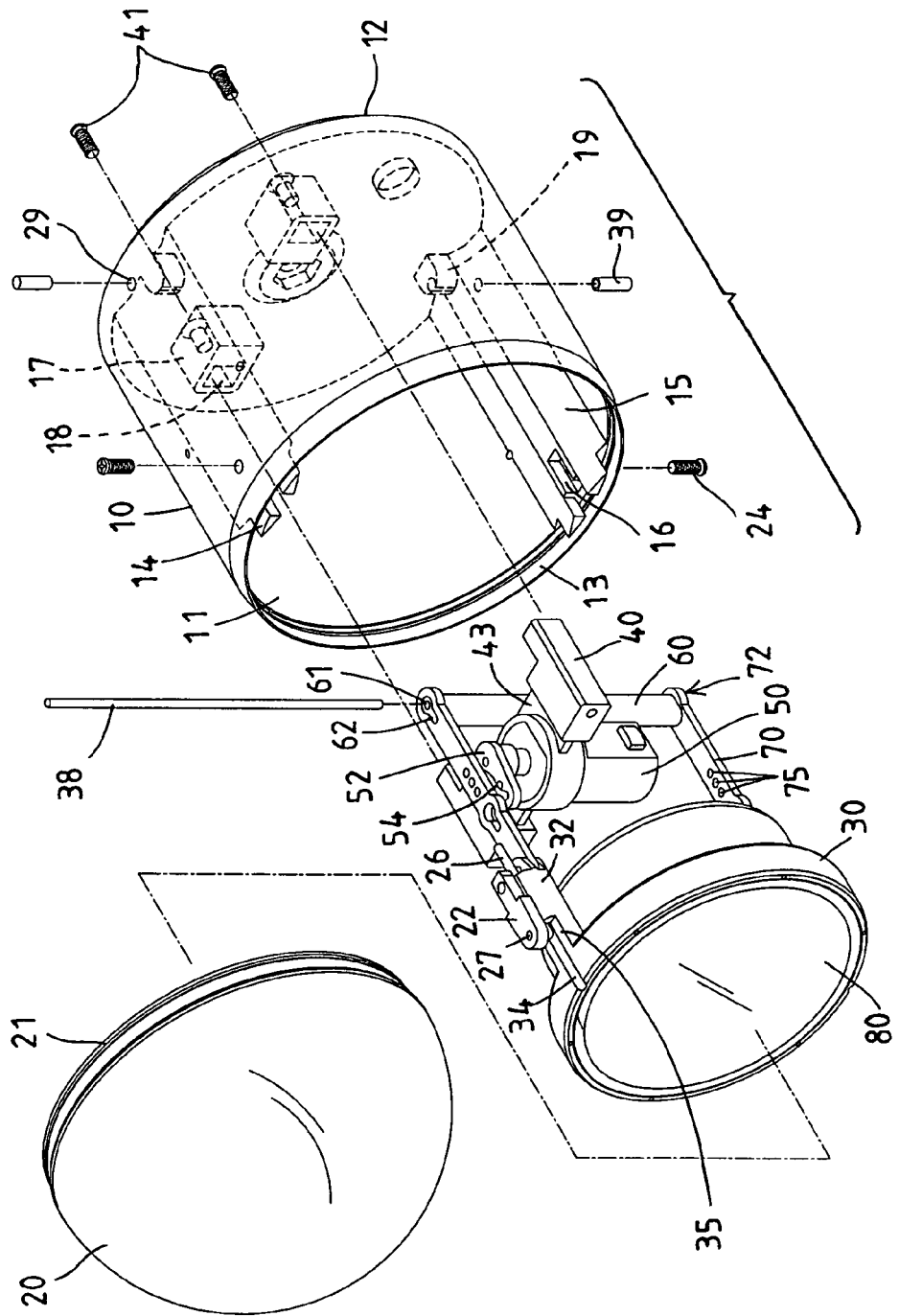
FIG. 2 is another partial exploded view of the headlight rotating device.
Figure 3:
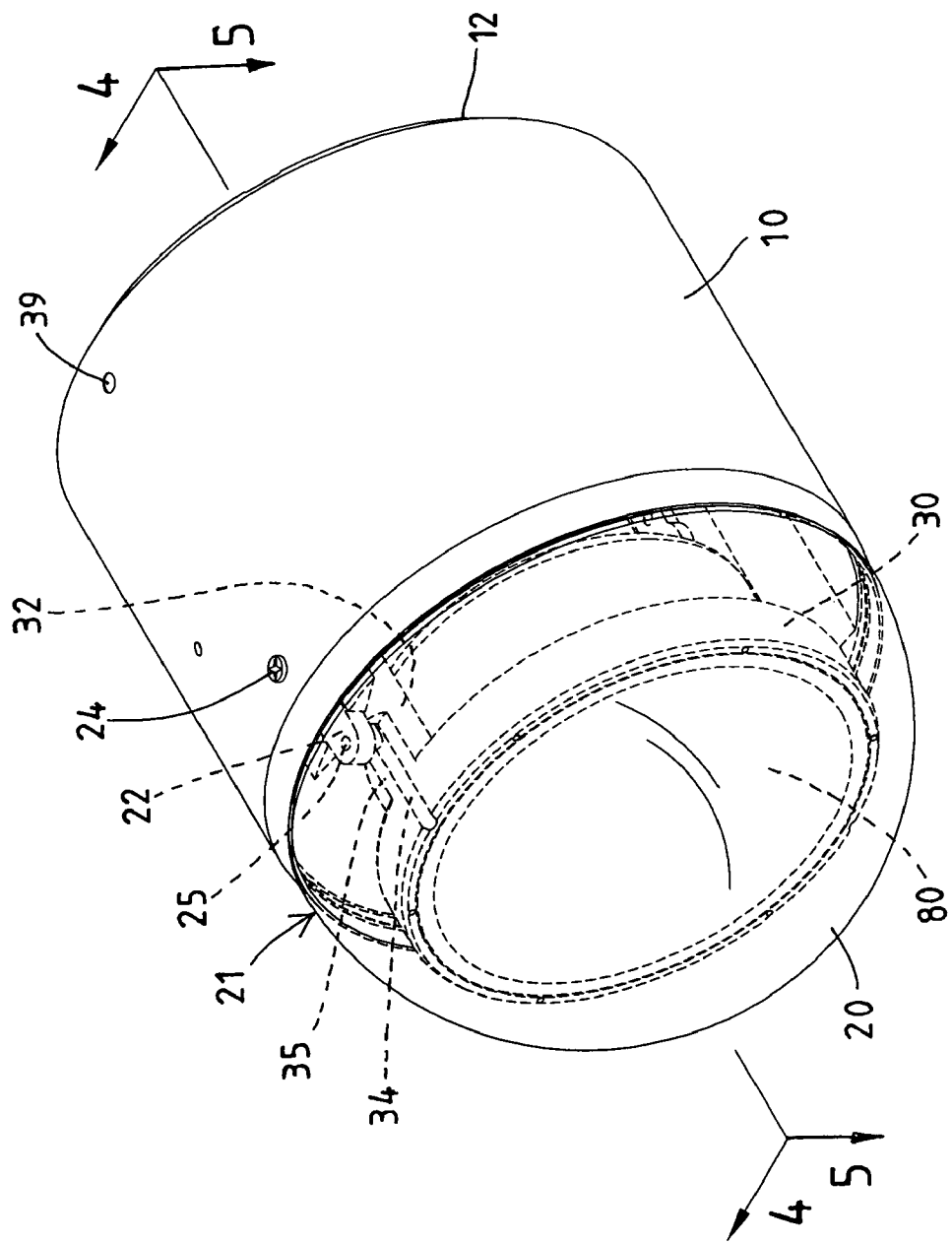
FIG. 3 is a perspective view of the adjustable headlight rotating device.
Figure 4:
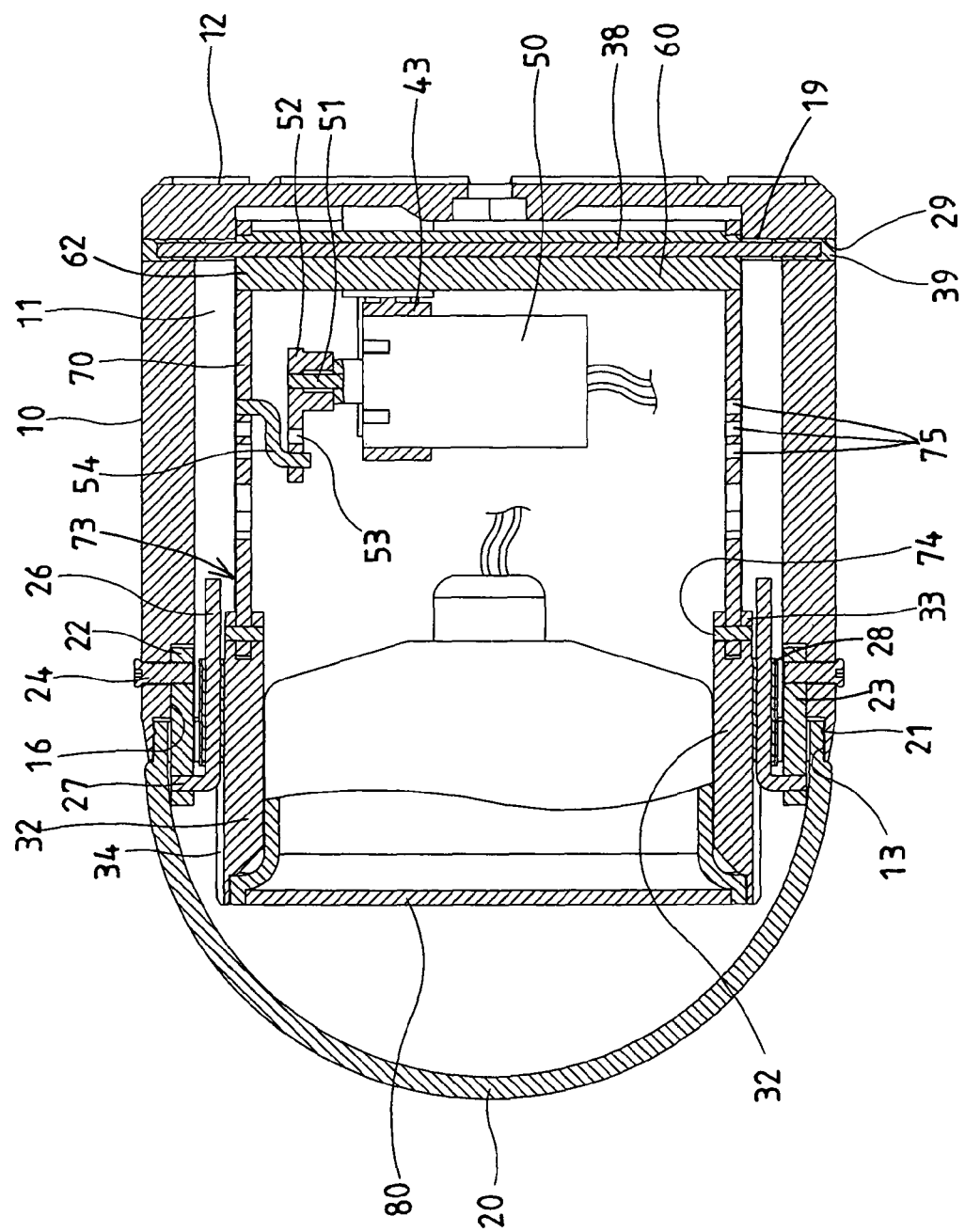
FIG. 4 is a cross sectional view of the headlight rotating device taken along lines 4-4 of FIG. 3.

Referring to the drawings, and initially to FIGS. 1-5, a headlight rotating device in accordance with the present invention comprises an outer receptacle or housing 10 including a chamber 11 formed therein, and including a rear wall 12 for enclosing or blocking the rear portion of the chamber 11 of the housing 10, and including a front opening 13 formed therein, and including one or more (such as two) depressions 16, such as an upper depression 16 and a lower depression 16 formed in the upper portion or upper bulge 14 and in the lower portion or lower bulge 15 respectively and communicative with the chamber 11 of the housing 10, and parallel to the longitudinal axis or direction of the chamber 11 of the housing 10.

A hood 20 includes a rear portion 21 attached or mounted or secured to the front portion or the front opening 13 of the housing 10 for enclosing or blocking or shielding the front portion of the chamber 11 of the housing 10. One or more (such as two) bars 22, 23 are attached or mounted or engaged into the depressions 16 of the housing 10 respectively and secured to the housing 10 with one or more fasteners 24, and each include an orifice 25 formed therein (FIGS. 1, 3) for pivotally or rotatably attaching or mounting or fitting a rod 26. For example, the rod 26 includes an axle 27 bent or extended therefrom and perpendicular to the rod 26 for pivotally or rotatably engaging into the orifice 25 of the bar 22, 23 and for pivotally or rotatably coupling the rods 26 to the bars 22, 23 respectively, and a collar or gasket or tubular member 28 is slidably attached or mounted or engaged onto each of the rods 26, or the rods 26 are slidable along the tubular member 28.

Figure 5:
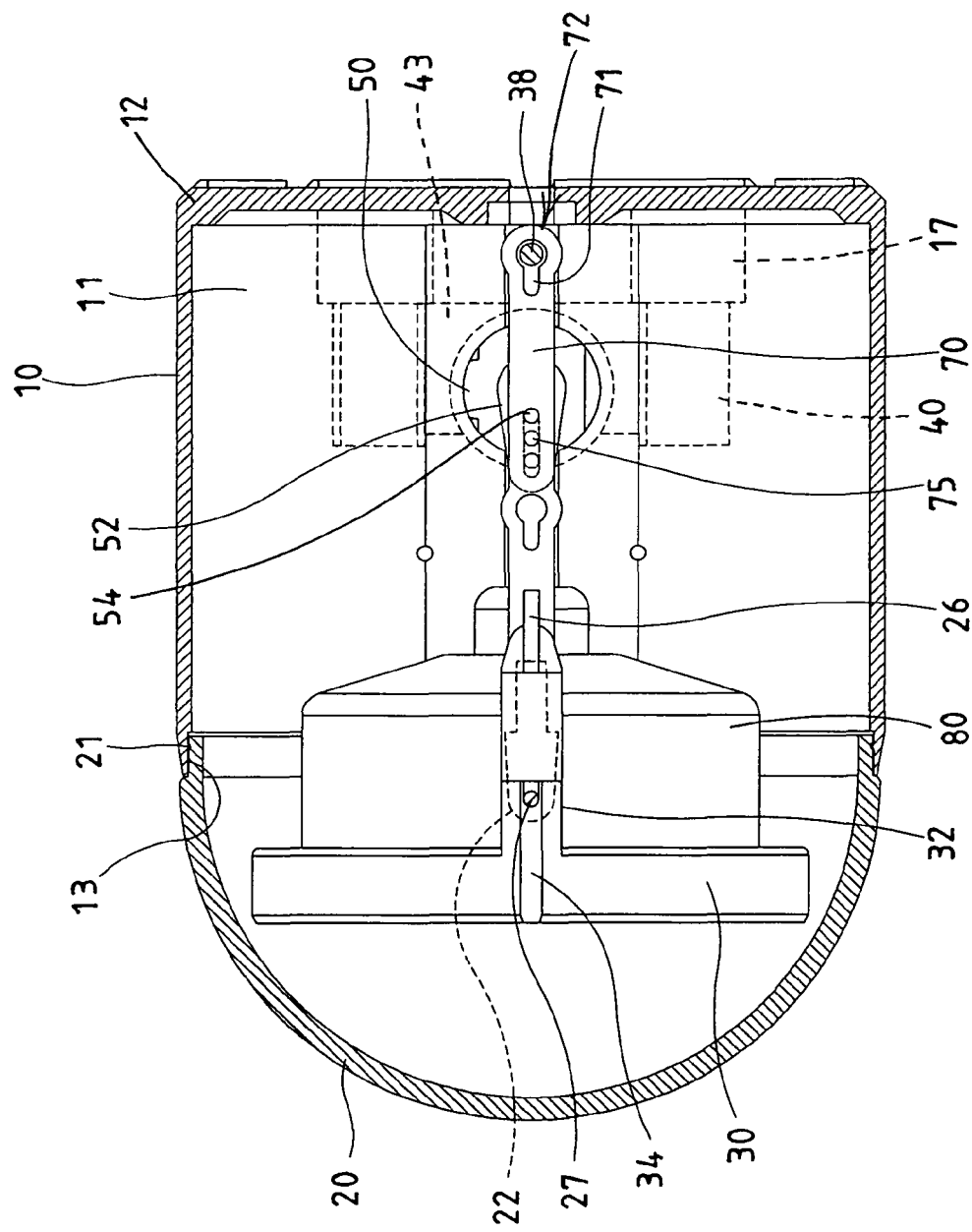
FIG. 5 is another cross sectional view of the headlight rotating device taken along lines 5-5 of FIG. 3.
Figure 6:
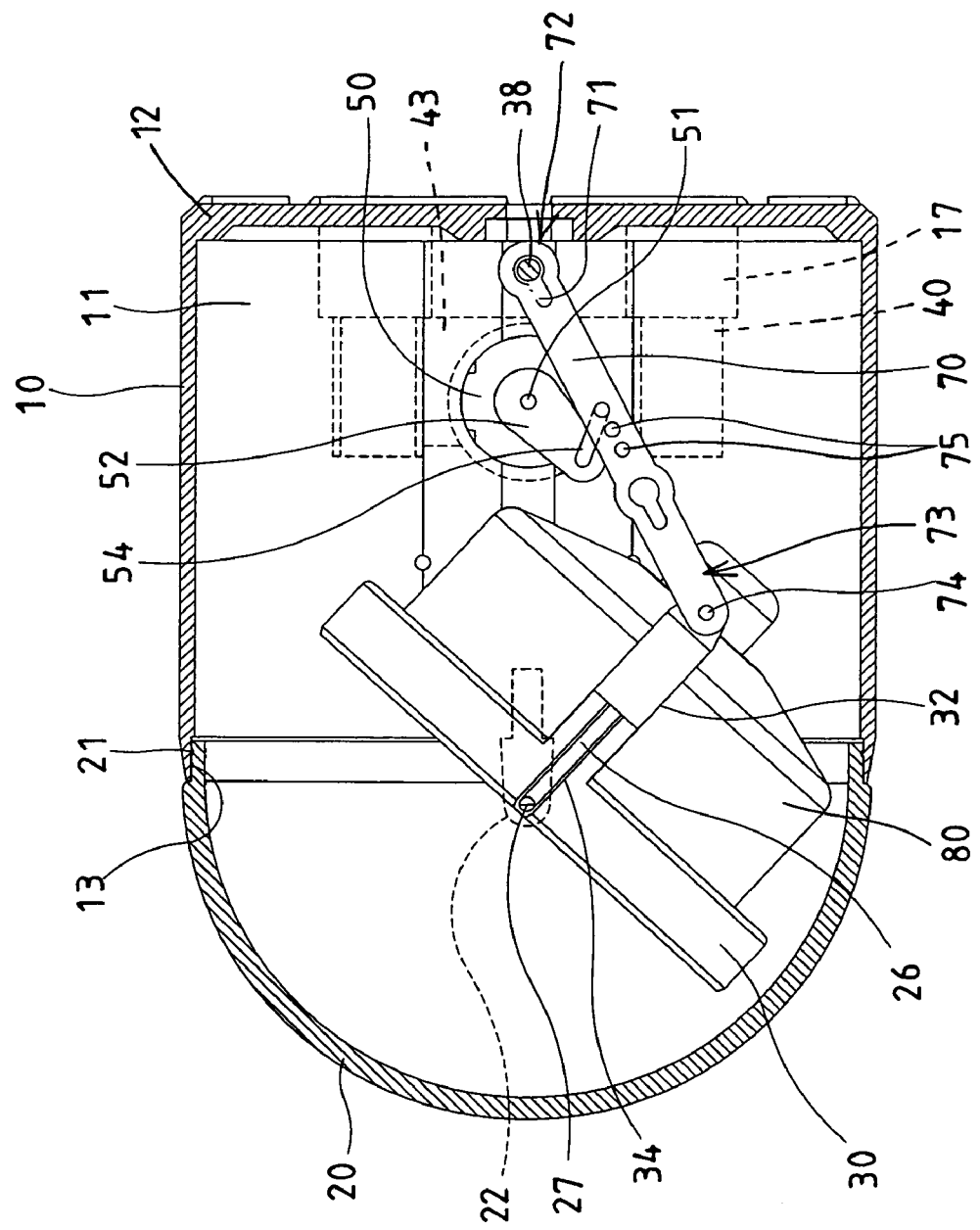
FIGS. 6, 7 are further cross sectional views similar to FIG. 5, illustrating the operation of the headlight rotating device.
Figure 7:
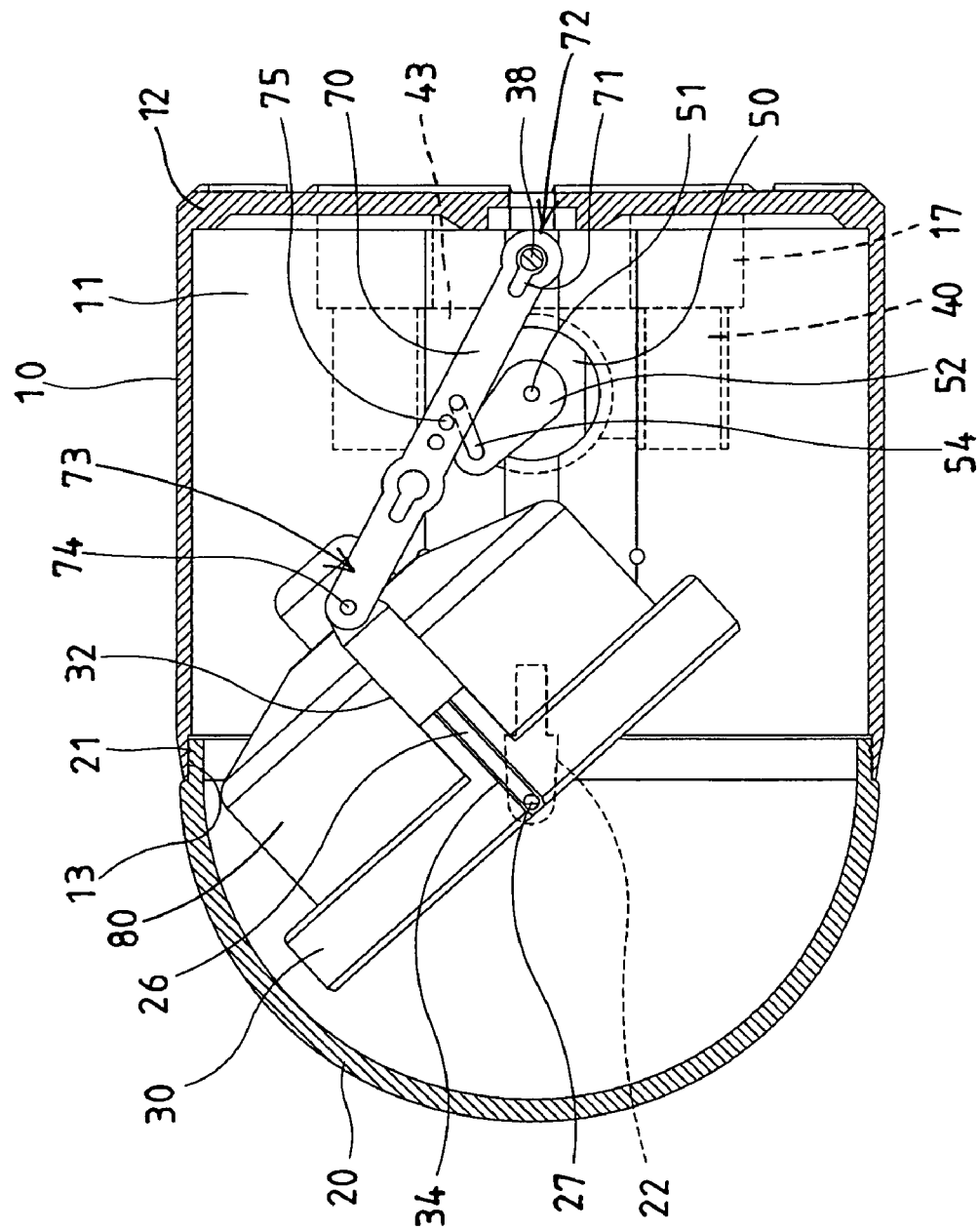

A frame or carrier 30 is disposed or received and supported in the chamber 11 of the housing 10, and includes a stepped space 31 formed therein for receiving or engaging with a light device 80, and includes one or more (such as two) arms 32 extended longitudinally and rearwardly therefrom and each having a rear or free end portion 33, and includes one or more (such as two) channels 34 formed therein, such as formed along the outer portions of the arms 32 respectively, and includes a cutoff portion or notch 35 formed in each of the arms 32 (FIGS. 1-3) and communicative with the channel 34 of the arm 32 for partially opening the channel 34 of the arm 32. The tubular members 28 are attached or mounted or engaged into the channels 34 of the arms 32 respectively, and the rods 26 are slidable along the tubular members 28 and the channels 34 of the arms 32 respectively (FIGS. 5-7).

As shown in FIGS. 1-2 and 5-7, the housing 10 includes one or more (such as two) protrusions 17 extended from the rear wall 12 of the housing 10 and extended into the chamber 11 of the housing 10, and the protrusions 17 each include a cavity 18 formed therein and facing toward and communicative with the chamber 11 of the housing 10, and one or more (such as two) beams 40 are attached or mounted or engaged with the cavities 18 of the protrusions 17 and secured to the protrusions 17 or the housing 10 with one or more fasteners 41, the beams 40 are arranged parallel to the longitudinal axis or direction of the chamber 11 of the housing 10 and each having a slot 42 formed therein for attaching or mounting or securing a seat 43.

A motor 50 is attached or mounted or secured to the seat 43, and disposed or received and supported in the chamber 11 of the housing 10, and includes a spindle 51 extended outwardly through the seat 43, and a crank 52 is attached or mounted or secured to the spindle 51 for being rotated or driven by the motor 50 and includes one or more apertures 53 formed therein for adjustably attaching or mounting or securing or coupling a link 54. The housing 10 may further include one or more (such as two) projections 19 extended from the rear wall 12 of the housing 10 and extended into the chamber 11 of the housing 10, and the projections 19 each include a cavity 29 formed therein for engaging with a shaft 38, and a peg or plug 39 engaged into the cavity 29 of each of the projections 19 for engaging with the shaft 38 and for attaching or mounting or securing the shaft 38 to the housing 10.

A column 60 includes a bore 61 formed therein for receiving or engaging with the shaft 38 and for allowing the column 60 to be pivoted or rotated relative to the housing 10, and includes one or more (such as two) keys 62 extended outwardly therefrom. One or more (such as two) levers 70 are disposed or received and supported in the chamber 11 of the housing 10, and each include a key hole 71 formed therein, such as formed in one end portion 72 thereof for engaging with the keys 62 of the column 60 and for allowing the levers 70 to be pivoted or rotated relative to the housing 10 together with the column 60, and each include another end portion 73 pivotally or rotatably coupled to the rear or free end portion 33 of the arm 32 of the carrier 30 with a pivot pin 74, and the levers 70 each include one or more perforations 75 formed therein for adjustably attaching or mounting or securing or engaging with or coupling to the link 54.

In operation, as shown in FIGS. 5-7, the levers 70 may be operated or actuated by the motor 50 to pivot or rotate relative to the housing 10 around the shaft 38 with the crank 52 and the link 54, and the carrier 30 and the light device 80 may be operated or actuated to pivot or rotate relative to the housing 10 around the axle 27, and the carrier 30 may be operated or actuated to move along or relative to the rod 26 and to move toward or away from the hood 20 when the carrier 30 and the light device 80 are pivoted or rotated relative to the housing 10 around the axle 27 by the levers 70 and the motor 50, the tubular members 28 are provided for facilitating the sliding movement of the rods 26 relative to the carrier 30, or for facilitating the pivoting or rotating movement of the carrier 30 relative to the housing 10.

Figure 8:
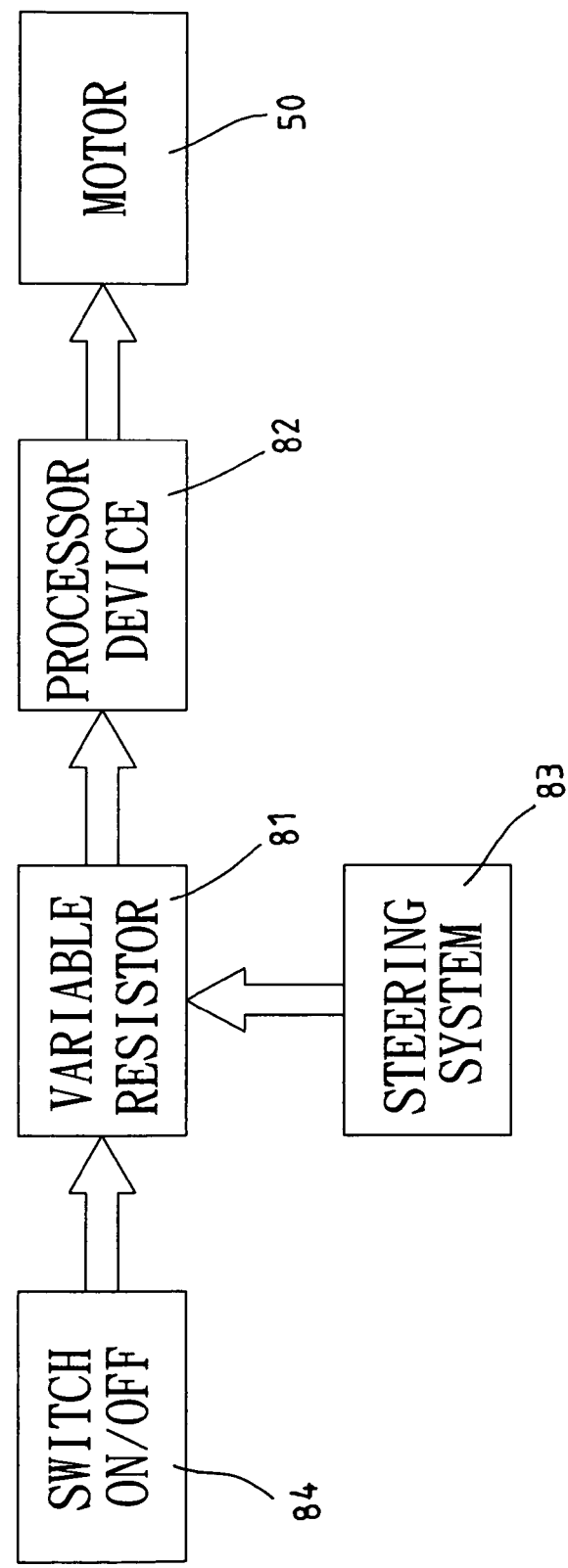
FIG. 8 is a block diagram illustrating the controlling or the actuation of the headlight in accordance with the movement of the vehicle's steering system.

As shown in FIG. 8, the headlight rotating device in accordance with the present invention may further include a variable resistor 81 coupled to the processor device 82 which is coupled to the motor 50 for operating or actuating the motor 50 rotate the levers 70 and the carrier 30 and the light device 80 relative to the housing 10, the variable resistor 81 is coupled to the steering system 83 of the vehicle for sensing or detecting the movement or the operation of the steering system 83 and for operating or actuating the processor device 82 to operate or actuate the motor 50 in accordance with the movement of the vehicle's steering system, and a switch 84 may further be provided and coupled to the variable resistor 81 for operating or actuating the headlight rotating device in accordance with the present invention.

It is to be noted that the link 54 may be adjustably attached or mounted or secured or engaged with either of the perforations 75 of the levers 70 in order to adjust the pivoting or rotating movement of the levers 70 and thus of the carrier 30 relative to the housing 10, and/or to adjust the sliding movement of the rods 26 relative to the carrier 30, and the link 54 may also be adjustably attached or mounted or secured or engaged with either of the apertures 53 of the crank 52 for further adjusting the pivoting or rotating movement of the levers 70 and thus of the carrier 30 relative to the housing 10 and/or for further adjusting the sliding movement of the rods 26 relative to the carrier 30.

Accordingly, the headlight rotating device in accordance with the present invention includes an improved structure for suitably pivoting or rotating a headlight device of a vehicle in accordance with the movement of the vehicle's steering system and for suitably lighting the environment for the vehicle driver, and including an adjustable structure for adjustably pivoting or rotating the headlight device of the vehicle and for fitting or mounting or attaching the headlight rotating device to various kinds of vehicles having headlight devices of different dimensions or sizes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A headlight rotating device comprising:
a housing including a chamber formed therein,
a hood attached to a front portion of said housing,
a carrier pivotally and slidably supported in said chamber of said housing with an axle and moveble toward and away from said hood, said carrier including a channel formed therein for slidably receiving a rod, and said axle being extended from said rod and pivotally coupled to said housing,
a light device attached to said carrier,
a lever pivotally supported in said chamber of said housing with a shaft, and pivotally coupled to said carrier for pivoting and sliding said carrier relative to said housing, and
a motor disposed in said chamber of said housing and coupled to said lever for rotating said lever to pivot and slide said carrier relative to said housing.

2. The headlight rotating device as claimed in claim 1, wherein said housing includes a bar attached thereto, and said axle is pivotally coupled to said bar of said housing.

3. The headlight rotating device as claimed in claim 2, wherein said housing includes a depression formed in a bulge for engaging with said bar.

4. The headlight rotating device as claimed in claim 1, wherein said carrier includes an arm having said channel formed in said arm for slidably receiving said rod.

5. The headlight rotating device as claimed in claim 4, wherein said carrier includes a tubular member engaged in said channel of said carrier for slidably receiving and engaging with said rod.

6. The headlight rotating device as claimed in claim 4, wherein said lever is pivotally coupled to said arm of said carrier.

7. The headlight rotating device as claimed in claim 1, wherein said housing includes two beams, and a seat attached to said beams for supporting said motor.

8. A headlight rotating device comprising:
a housing including a chamber formed therein,
a hood attached to a front portion of said housing,
a carrier pivotally and slidably supported in said chamber of said housing with an axle and moveble toward and away from said hood,
a light device attached to said carrier,
a lever pivotally supported in said chamber of said housing with a shaft, and pivotally coupled to said carrier for pivoting and sliding said carrier relative to said housing, said lever including a key hole formed therein,
a column disposed in said chamber of said housing and including a key extended outwardly therefrom and engaged with said key hole of said lever, and
a motor disposed in said chamber of said housing and coupled to said lever for rotating said lever to pivot and slide said carrier relative to said housing.

9. A headlight rotating device comprising:
a housing including a chamber formed therein,
a hood attached to a front portion of said housing,
a carrier pivotally and slidably supported in said chamber of said housing with an axle and moveble toward and away from said hood,
a light device attached to said carrier,
a lever pivotally supported in said chamber of said housing with a shaft, and pivotally coupled to said carrier for pivoting and sliding said carrier relative to said housing, and
a motor disposed in said chamber of said housing and coupled to said lever for rotating said lever to pivot and slide said carrier relative to said housing, said motor including a spindle, and a crank attached to said spindle and coupled to said lever with a link.

10. The headlight rotating device as claimed in claim 9, wherein said lever includes at least two perforations formed therein for adjustably engaging with said link.

11. The headlight rotating device as claimed in claim 9, wherein said crank includes at least two apertures formed therein for adjustably engaging with said link.

* * * * *